Feb. 5, 1957 J. P. DAIL ET AL 2,780,026
INSECT CATCHERS
Filed Jan. 23, 1956 2 Sheets-Sheet 1

INVENTOR
JOHN P. DAIL
ROSCOE F. HILL
BY Stone, Boyden & Mack,
ATTORNEYS

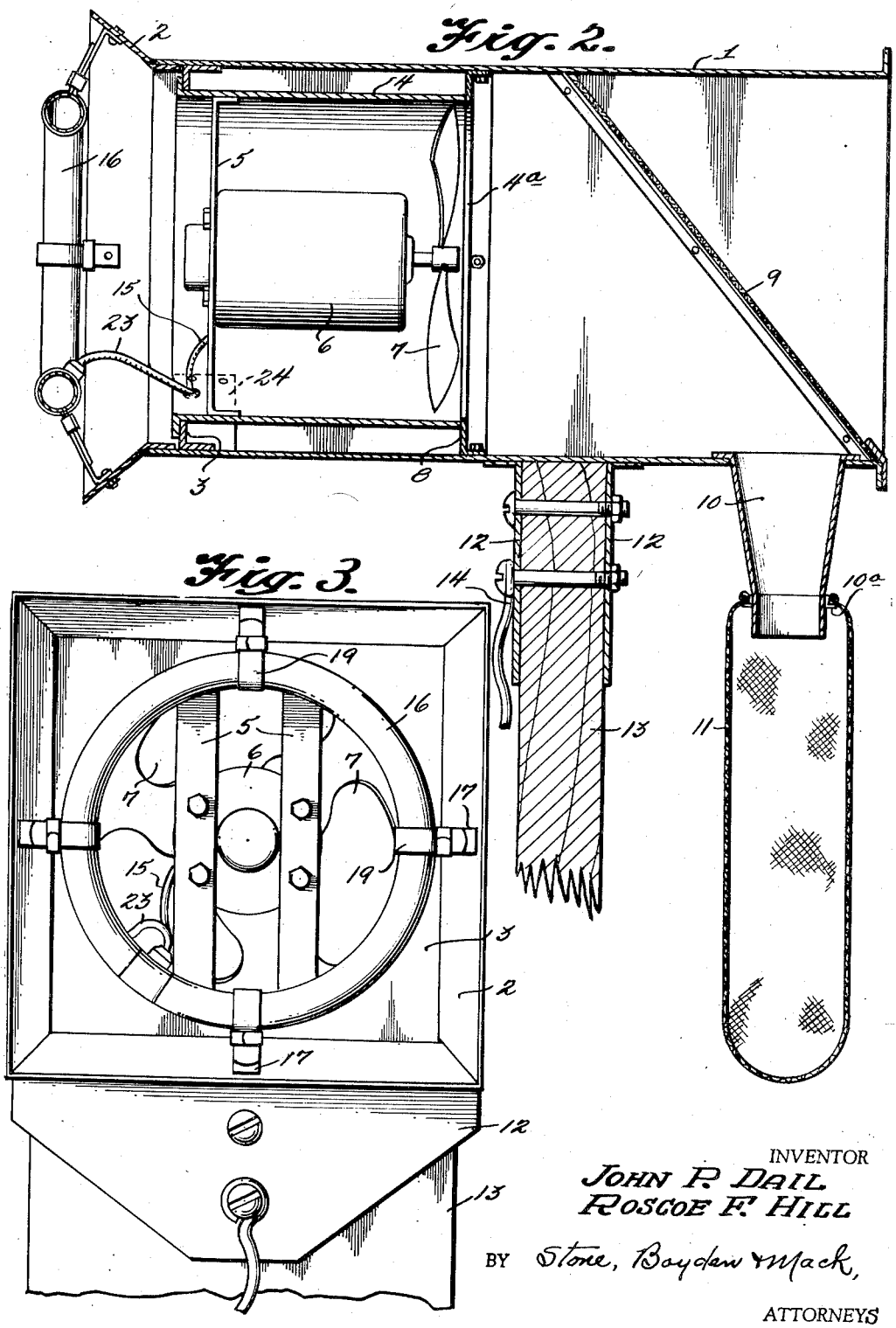

United States Patent Office 2,780,026
Patented Feb. 5, 1957

2,780,026

INSECT CATCHERS

John P. Dail and Roscoe F. Hill, La Grange, N. C., assignors to D. and H. Corporation, La Grange, N. C., a corporation of North Carolina Application January 23, 1956, Serial No. 560,541

7 Claims. (Cl. 43—139)

This invention relates to insect catchers or destroyers, and more particularly to apparatus for catching or destroying winged insects which fly at night.

Among the insects which our apparatus is designed to catch may be mentioned mosquitoes, tobacco worm moths, corn ear worm moths, and certain types of flies.

The general object of the invention is to provide relatively simple apparatus which may be set up in a field, barn or other location and which will effectively attract and catch winged insects from a large surrounding area.

A specific object of the invention is to provide apparatus equipped with a lamp having both improved physical form and capable of generating radiation of a special character.

Another specific object is to devise improved means for mounting such a lamp so that it may be held within the confines of the apparatus for shipping and storage purposes, so as to avoid danger of breakage, or supported at a point wholly outside of the apparatus, when in operative position so as to radiate light in all directions.

With the above and other objects in view, and to improve generally on the details of such apparatus, the invention consists in the construction and combination of parts hereinafter described and claimed, and illustrated in the accompanying drawings, forming part of this specification, and in which:

Fig. 2 is a vertical longitudinal section through the same;

Fig. 3 is an end elevation thereof;

Figure 1:
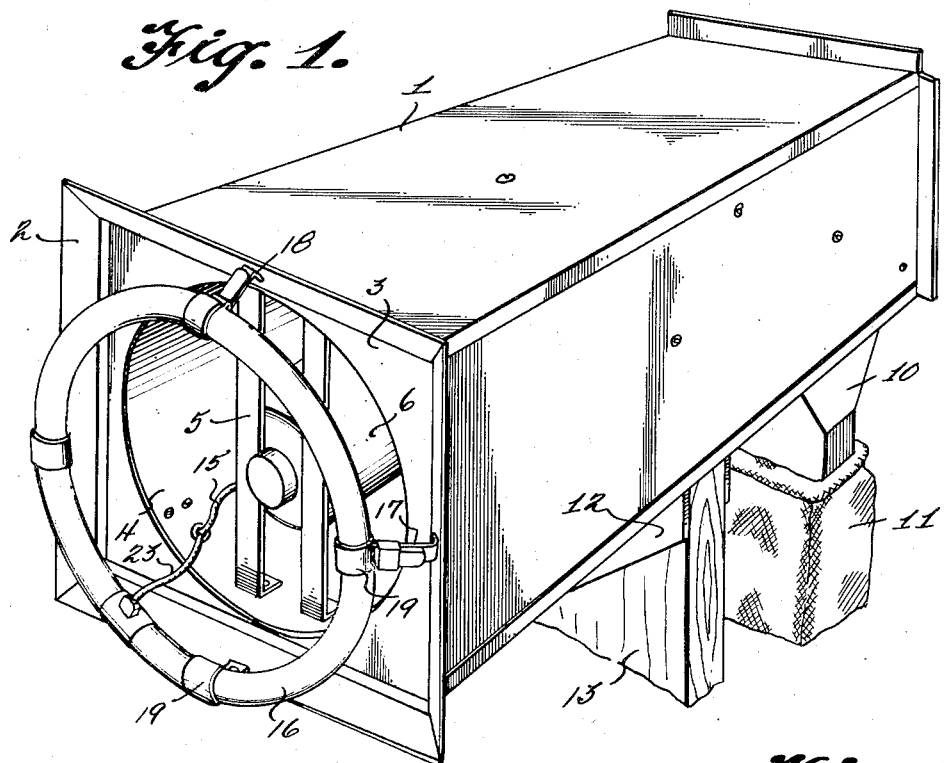
Fig. 1 is a perspective view of our complete apparatus as it appears when in use.

Referring to the drawings in detail, our improved apparatus comprises an elongated casing 1 which may be conveniently made of sheet metal and which is preferably square in cross section. The front or intake end of the casing is surrounded by an outwardly flaring peripheral flange 2. Inside of this flange is a transversely extending plate 3 having a large central opening therein. A similar plate 8 is mounted within the casing and spaced a substantial distance from the plate 3, as clearly shown in Fig. 2.

Mounted within the casing and extending between these two transverse plates is a cylindrical conduit 4 registering with openings in the plates. Supported within this conduit as by a pair of brackets 5 is a motor 6 and fan 7, the fan being substantially the same size as the inside diameter of the conduit 4.

It will be particularly noted that this fan is located substantially at the discharge end of the conduit 4, and that this conduit is substantially smaller in cross section than the casing itself. For this reason it will be seen that air is drawn into and through the conduit by the suction fan 7 at relatively high velocity, and that upon being discharged from the fan into the casing, the velocity of this air is substantially reduced.

Extending diagonally across the casing 1 at a point to the rear of the fan is a woven wire or other reticulated screen 9, and immediately beneath the lower end of this screen is a discharge funnel 10. Removably suspended from the lower end of this funnel as by means of lugs 10$^a$ is a receptacle 11 which may preferably be made of woven wire or open mesh fabric.

Secured to the bottom of the casing 1 at a point intermediate its length are a pair of spaced brackets 12 adapted to fit over and be secured to the top of a post 13, for supporting the casing in horizontal position. A ground wire 14 is preferably attached to one of these brackets so as to avoid any possibility of electric shock to those handling the apparatus. Current is supplied to the motor 6 by means of a conductor 15, to which is attached a suitable extension cord (not shown) for plugging in to a source of current.

Figures 4, 6:
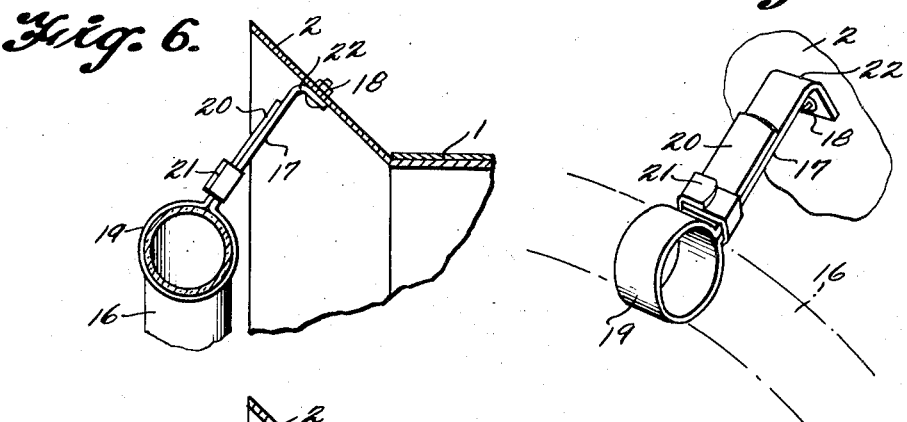
Fig. 4 is a fragmentary perspective view showing our improved holder for the lamp.
Figure 5:
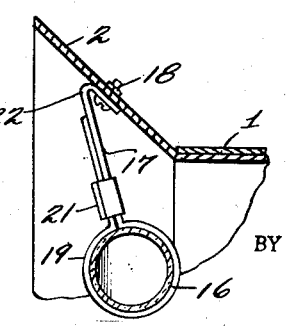
Fig. 5 is a fragmentary longitudinal section through the intake end of the casing showing the lamp in the position which it occupies when packed for shipment or storage; and, Fig. 6 is a similar view showing the lamp as it appears when in operative position.

Mounted on the flange 2 at the intake end of the casing is a circular tubular fluorescent lamp 16. We have devised a special method of mounting this lamp as best shown in Figs. 4, 5, and 6. The lamp is supported by a plurality of radially extending strips 17 of semi-rigid bendable material, these strips being rigidly secured at their outer ends to the flange as by means of bolts 18. The inner ends of these strips are looped around the lamp as shown at 19, the free ends being secured by means of a clip 21. The loops 19 are thus capable of rotating on the tubular lamp.

When the apparatus is packed for shipment or storage, the lamp is pushed rearwardly into the position shown in Fig. 5 in which it lies wholly within the confines of the casing and flange, the strips 17 being bent at an acute angle as shown at 22. In this position the lamp is effectively protected from injury.

When however, the apparatus is set up for operation, the lamp is pulled outwardly into the position shown in Figs. 2, 4, and 6, in which it lies outside and beyond the edge of the flange 2, so that the light may radiate to the sides of the apparatus as well as to the front. It will be understood that in moving the lamp from the position shown in Fig. 5 to that shown in Fig. 6 the strips 17 are bent outwardly at the points 22, and having been bent outwardly, they are of sufficient rigidity to hold the lamp in operative position.

It will be noted that the diameter of the conduit 4 is at least equal to the inside diameter of the lamp 16, and may be somewhat larger, as shown.

Current is supplied to the lamp by means of a conductor 23 which connects with suitable ballast 24, housed in one of the corners of the casing outside of the conduit 4, as indicated by broken lines in Fig. 2.

While any suitable type of fluorescent lamp may be employed we have found that exceptionally good results are obtained by using a so-called "black-light" lamp in which the tube is coated with a special phosphor which produces radiation of a wave length between 3000 and 4000 Angstroms with a peak around 3500 Angstroms, in the near ultraviolet region, as described for example in a General Electric Company bulletin dated January 1956. This lamp emits a certain amount of visible light of a deep violet color, as well as large amounts of ultraviolet light. It may be that this ultraviolet light of short wave length is visible to the eyes of insects, but in any event, and whatever the reason, we have found that when a "black-light" lamp of this kind is set up, even at a relatively great distance from ordinary incandescent or fluorescent lamps, the insects will leave or disregard the ordinary lamps and will flock to this "black-light" lamp.

The operation of the apparatus will be obvious from the foregoing description. The current having been turned on, insects will be attracted by the light from the lamp and will fly toward it. Meanwhile the fan produces a strong suction which draws the insects in through and around the lamp and through the conduit 4, and discharges them with the air into the rear portion of the casing 1. As above explained, the air is discharged into the casing from the fan at reduced velocity, owing to the relatively greater size of the casing, and the insects strike the screen 9, while the air passes on through the screen and escapes from the open rear end of the casing. The insects striking the screen 9 are guided or directed downwardly along the same and delivered through the funnel 10 into the receptacle 11. This may be removed and emptied from time to time. It will be noted that the receptacle hangs from the bottom of the casing where it is readily accessible without disturbing any other part of the apparatus.

What we claim is:

1. Apparatus for catching winged insects comprising an elongated casing, a relatively short cylindrical conduit housed in one end of said casing, a circular tubular lamp mounted adjacent one end of said conduit, said conduit having a diameter at least as large as the inside diameter of said circular lamp, a suction fan mounted in said conduit adjacent the other end thereof, whereby air and insects attracted by the light of said lamp are drawn in through said lamp and conduit and are discharged from the fan into said casing, a receptacle communicating with said casing for containing the insects thus discharged, and means for directing the insects into said receptacle while permitting the air to freely escape from said casing.

2. Apparatus for catching winged insects comprising an elongated casing of square cross-section, means for supporting said casing in horizontal position, a relatively short cylindrical conduit housed in one end of said casing, a circular tubular lamp mounted adjacent one end of said conduit, and a suction fan mounted adjacent the other end of said conduit, whereby air and insects attracted by the light of said lamp are drawn in through said lamp and conduit and are discharged by the fan into said casing, said conduit being substantially smaller in cross-section than said casing, whereby the velocity of the air after leaving said fan is reduced, a receptacle for containing insects in communication with said casing through the bottom thereof and depending below the same and means for directing the insects discharged by the fan into said receptacle, while permitting the free escape of the air at reduced velocity from said casing.

3. Apparatus for catching winged insects comprising an elongated casing of square cross-section, means for supporting said casing in horizontal position, a relatively short cylindrical conduit housed in one end of said casing, a circular tubular lamp mounted adjacent one end of said conduit, and a suction fan mounted adjacent the other end of said conduit, whereby air and insects attracted by the light of said lamp are drawn in through said lamp and conduit and are discharged by the fan into said casing, a receptacle for containing insects in communication with said casing through the bottom thereof and depending below the same, the rear end of said casing being open, and a reticulated screen extending diagonally across said casing at a point between said fan and the open end of said casing, the lower end of said screen being so positioned as to direct the insects into said receptacle.

4. Apparatus for catching winged insects comprising an elongated casing, a relatively short cylindrical conduit housed in one end of said casing, a circular, fluorescent tubular lamp mounted adjacent one end of said conduit, said lamp being constructed to emit a substantial amount of light in the near ultra-violet region, having a deep violet color, said conduit having a diameter at least as large as the inside diameter of said circular lamp, a suction fan mounted in said conduit adjacent the other end thereof, whereby air and insects attracted by the light of said lamp are drawn in through said lamp and conduit and are discharged from the fan into said casing, a receptacle connected with said casing for containing the insects thus discharged, and means for directing the insects into said receptacle while permitting the air to freely escape from said casing.

5. Apparatus for catching winged insects comprising an elongated casing, a relatively short cylindrical conduit housed in one end of said casing, a circular, fluorescent tubular lamp mounted adjacent one end of said conduit, said lamp being coated with a special phosphor causing the peak of its radiation to be of a wave length of around 3500 Angstroms, said conduit having a diameter at least as large as the inside diameter of said circular lamp, a suction fan mounted in said conduit adjacent the other end thereof, whereby air and insects attracted by the light of said lamp are drawn in through said lamp and conduit and are discharged from the fan into said casing, a receptacle connected with said casing for containing the insects thus discharged, and means for directing the insects into said receptacle while permitting the air to freely escape from said casing.

6. In apparatus for catching winged insects, an elongated casing containing a suction fan, said casing having at one end an intake opening, a peripheral flange surrounding said opening, a circular, tubular lamp of such size as to be received within said flange, and means for so mounting said lamp that it may be moved to and will remain in either a position outside the plane of the edge of said flange, or a position within said flange, as desired.

7. In apparatus for catching winged insects, an elongated casing containing a suction fan, said casing having at one end an intake opening, a peripheral flange surrounding said opening, a circular, tubular lamp of such size as to be received within said flange, and a series of radially disposed semi-rigid, bendable strips anchored at their outer ends to said flange, and having their inner ends looped around said lamp, and rotatable thereon.

References Cited in the file of this patent

UNITED STATES PATENTS

| | | |
|---|---|---|
| 959,155 | Nault | May 24, 1910 |
| 2,013,969 | Menasche | Sept. 10, 1935 |

OTHER REFERENCES

Electronics Dictionary, by N. M. Cooke and John Markus, page 36. Published 1945 by McGraw-Hill Book Co., Inc., New York.